United States Patent Office 3,426,049
Patented Feb. 4, 1969

3,426,049
NITROTRIFLUOROMETHYLANILIDES
Joseph W. Baker, Kirkwood, Mo., assignor to Monsanto Company, St. Louis, Mo., a corporation of Delaware
No Drawing. Filed Oct. 18, 1965, Ser. No. 497,437
U.S. Cl. 260—404                6 Claims
Int. Cl. C07c 103/30

ABSTRACT OF THE DISCLOSURE

This disclosure relates to certain nitrotrifluoromethylanilides and complexes thereof as new compositions of matter. These compositions of matter have been found to possess microbiological activity and are particularly adapted for the control of bacteria.

---

This invention relates to a novel class of organic chemical compositions of matter. More particularly, this invention is concerned with certain new compounds which are anilides containing the nitro and trifluoromethyl groups as substituents on the aniline nucleus. In addition to such compounds per se, the invention also includes the complexes thereof with α,α,α-trifluoro-4-nitro-m-toluidine. The aforesaid anilides and complexes have been found to possess useful and unexpected microbiological activity.

The novel anilides of this invention are those of the formula

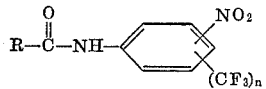

wherein:

R is selected from the group consisting of alkyl, alkenyl, alkyldienyl and alkynyl of from 4 to 11 carbon atoms; mono- and di-haloalkyl and alkenyl of from 4 to 11 carbon atoms, the halogen being selected from the group consisting of chlorine and bromine; cycloalkyl of from 5 to 6 carbon atoms and phenethyl;
provided however that when the carbon atom of R which is directly attached to the carbonyl group of the anilide is a tertiary carbon atom, then R must contain a total of at least 6 carbon atoms;
n is an integer selected from 1 and 2; and the aniline nucleus is free of ortho substituents.

The novel complexes of this invention are those of the formula

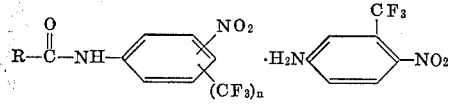

wherein R and n have the same meaning as above.

The anilides of the invention can be readily prepared by several different methods. Generally, one such method comprises the acid catalyzed reaction of a nitrotrifluoromethylaniline with an anhydride. As an alternative, such an aniline can be employed in a condensation reaction with an acid chloride. In the latter case the reaction mixture is refluxed for several hours to expel the hydrogen chloride by-product. If desired, a tertiary amine can be added to the reactants to serve as an acceptor for the by-product.

When the acid chloride is free of alpha substituents, and when a tertiary amine acceptor is used, a 1:1 molar complex of the anilide and the aniline is obtained. The use of tertiary amines as hydrohalide acceptors is well known. Suitable amines, in addition to the tertiary alkyls, include dimethylaniline, pyridine and the like. Such an anilide/aniline complex can be broken up by dissolving the complex in ether and adding an excess of ethereal hydrogen chloride. An aniline hydrochloride precipitates, and the anilide can be recovered from the filtrate. The complexes of the invention can also be obtained by dissolving the anilide and the aniline in a hot mixture of toluene and methylcyclohexane, or in another suitable, inert, organic solvent. The desired complex precipitates upon cooling.

The invention will be more fully understood by reference to the following examples. These examples, however, are given for the purpose of illustration only and are not to be construed as limiting the scope of the present invention in any manner.

Example 1

A suitable reaction vessel is charged with a solution of 10.3 grams (0.05 mole) of α,α,α-trifluoro-4-nitro-m-toluidine in 100 ml. of toluene. The solution is stirred while 6.6 grams (0.055 mole) of valeryl chloride are slowly added. The reaction mixture is maintained at reflux temperature for about two hours until the evolution of hydrogen chloride ceases, after which 75 ml. of methylcyclohexane is added. Said mixture is then cooled, and the precipitate is collected. Recrystallization from toluene yields α,α,α-trifluoro-4'-nitro-m-valerotoluidide, M.P. 94–95° C. Analysis shows 9.49% nitrogen as against a calculated value of 9.65% for $C_{12}H_{13}F_3N_2O_3$.

Example 2

A suitable reaction vessel is charged with a solution of 10.3 grams (0.05 mole) of α,α,α-trifluoro-4-nitro-m-toluidine in 75 ml. of methylcyclohexane and 125 ml. of toluene. The solution is stirred while 6.6 grams (0.055 mole) of isovaleryl chloride are slowly added. The reaction mixture is maintained at reflux temperature for about two hours until the evolution of hydrogen chloride ceases. Said mixture is then filtered and cooled, and the precipitate is collected. Recrystallization from a mixture of toluene-methylcyclohexane yields α,α,α-trifluoro-4'-nitro-m-isovalerotoluidide, M.P. 103–104° C. Analysis shows 9.49% nitrogen as against a calculated value of 9.65% for $C_{12}H_{13}F_3N_2O_3$.

Example 3

A suitable reaction vessel is charged with a solution of 10.3 grams (0.05 mole) of α,α,α-trifluoro-4-nitro-m-toluidine in 200 ml. of methylcyclohexane. The solution is stirred while a solution of 6.6 grams (0.055 mole) of 2-methylbutyryl chloride in 50 ml. of methylcyclohexane is slowly added. The reaction mixture is maintained at reflux temperature for about two hours until the evolution of hydrogen chloride ceases. Said mixture is then cooled, and the precipitate is collected. Recrystallization from a mixture of toluene-methylcyclohexane yields α,α,α-trifluoro-2-methyl-4'-nitro-m-butyrotoluidide, M.P. 111–112° C. Analysis shows 9.60% nitrogen as against a calculated value of 9.65% for $C_{12}H_{13}F_3N_2O_3$.

Example 4

A suitable reaction vessel is charged with a solution of 10.3 grams (0.05 mole) of α,α,α-trifluoro-4-nitro-m-toluidine is 150 ml. of a toluene-methylcyclohexane mixture. The solution is stirred while 7.4 grams (0.055 mole) of 4-methylvalerylchloride are slowly added. The reaction mixture is maintained at reflux temperature for about two hours until the evolution of hydrogen chloride ceases. Said mixture is then cooled, and the precipitate is collected. Recrystallization from a mixture of toluene-methylcyclohexane yields α,α,α-trifluoro-4-methyl-4'-nitro-m-valerotoluidide, M.P. 85–87° C.

Example 5

A suitable reaction vessel is charged with a solution of 10.3 grams (0.05 mole) of α,α,α-trifluoro-4-nitro-m-toluidine in 200 ml. of methylcyclohexane. The solution is stirred while 7.4 grams (0.055 mole) of hexanoyl chloride are slowly added. The reaction mixture is maintained at reflux temperature for about four hours until the evolution of hydrogen chloride ceases. Said mixture is then cooled, and the precipitate is collected. Recrystallization from toluene yields α,α,α-trifluoro-4'-nitro-m-hexanotoluidide, M.P. 73–74° C. Analysis shows 9.14% nitrogen as against a calculated value of 9.21% for $C_{13}H_{15}F_3N_2O_3$.

Example 6

A suitable reaction vessel is charged with a solution of 10.3 grams (0.05 mole) of α,α,α-trifluoro-4-nitro-m-toluidine in 200 ml. of methylcyclohexane. The solution is stirred while 8.2 grams (0.055 mole) of neoheptanoyl chloride are slowly added. The reaction mixture is maintained at reflux temperature for about three hours until the evolution of hydrogen chloride ceases. Said mixture is then cooled, and the precipitate is collected. Recrystallization from toluene yields α,α,α-trifluoro-2,2-dimethyl-4'-nitro-m-valerotoluidide, M.P. 110.5–112° C. Analysis shows 8.95% nitrogen as against a calculated value of 8.90% for $C_{14}H_{17}F_3N_2O_3$.

Example 7

A suitable reaction vessel is charged with a solution of 10.3 grams (0.05 mole) of α,α,α-trifluoro-4-nitro-m-toluidine in 150 ml. of a toluene-methylcyclohexane mixture. The solution is stirred while a solution of 10.5 grams (0.055 mole) of decanoyl chloride in 20 ml. of toluene is slowly added. The reaction mixture is maintained at reflux temperature for about two hours until the evolution of hydrogen chloride ceases. Said mixture is then cooled, and the precipitate is collected. Recrystallization from a mixture of toluene-methylcyclohexane yields α,α,α-trifluoro-4'-nitro-m-decanotoluidide, M.P. 77–78° C. Analysis shows 7.64% nitrogen as against a calculated value of 7.78% for $C_{17}H_{23}F_3N_2O_3$.

Example 8

A suitable reaction vessel is charged with a solution of 10.3 grams (0.05 mole) of α,α,α-trifluoro-4-nitro-m-toluidine in 300 ml. of methylcyclohexane. The solution is stirred while 11.2 grams (0.055 mole) of undecanoyl chloride are slowly added. The reaction mixture is maintained at reflux temperature for about two hours until the evolution of hydrogen chloride ceases. Said mixture is then cooled, and the precipitate is collected. Recrystallization from methylcyclohexane yields α,α,α-trifluoro-4'-nitro-m-undecanotoluidide, M.P. 82–83° C. Analysis shows 7.29% nitrogen as against a calculated value of 7.48% for $C_{18}H_{25}FN_2O_3$.

Example 9

A suitable reaction vessel is charged with a solution of 10.3 grams (0.05 mole) of α,α,α-trifluoro-3-nitro-p-toluidine in 200 ml. of methylcyclohexane. The solution is stirred while 8.2 grams (0.055 mole) of heptanoyl chloride are slowly added. The reaction mixture is maintained at reflux temperature for about four hours until the evolution of hydrogen chloride ceases. Said mixture is then cooled, and the precipitate is collected. Recrystallization from methylcyclohexane yields α,α,α-trifluoro-3'-nitro-p-heptanotoluidide.

Example 10

A suitable reaction vessel is charged with a solution of 10.3 grams (0.05 mole) of α,α,α-trifluoro-4-nitro-m-toluidine in 150 ml. of a toluene-methylcylohexane mixture. The solution is stirred while 7.3 grams (0.055 mole) of cyclopentanecarbonyl chloride are slowly added. The reaction mixture is maintained at reflux temperature for about two hours until the evolution of hydrogen chloride ceases. Said mixture is then filtered and cooled, and the precipitate is collected. Recrystallization from a mixture of toluene-methylcyclohexane yields α,α,α-trifluoro-4'-nitrocyclopentanecarboxy-m-toluidide, M.P. 143–144° C. Analysis shows 9.41% nitrogen as against a calculated value of 9.65% for $C_{13}H_{13}F_3N_2O_3$.

Example 11

A suitable reaction vessel is charged with a solution of 10.3 grams (0.05 mole) of α,α,α-trifluoro-4-nitro-m-toluidine in 150 ml. of a toluene-methylcyclohexane mixture. The solution is stirred while 8.1 grams (0.055 mole) of cyclohexanecarbonyl chloride are slowly added. The reaction mixture is maintained at reflux temperature for about two hours until the evolution of hydrogen chloride ceases. Said mixture is then filtered and cooled, and the precipitate is collected. Recrystallization from a mixture of toluene-methylcyclohexane yields α,α,α-trifluoro-4'-nitro-cyclohexanecarboxy-m-toluidide, M.P. 135–136° C.

Example 12

A suitable reaction vessel is charged with a solution of 5.2 grams (0.025 mole) of α,α,α-trifluoro-4-nitro-m-toluidine in 200 ml. of methycyclohexane. The solution is stirred while 4.6 grams (0.027 mole) of hydrocinnamoyl chloride are slowly added. The reaction mixture is maintained at reflux temperature for about two hours until the evolution of hydrogen chloride ceases. Said mixture is then cooled, and the precipitate is collected. Recrystallization from Skellysolve B (an essentially n-hexane solvent having a boiling range of 60–70° C.) yields α,α,α-trifluoro-4'-nitro-3-phenyl-m-propionotoluidide, M.P. 90.5–92° C.

Example 13

A suitable reaction vessel is charged with a solution of 10.3 grams (0.05 mole) of α,α,α-trifluoro-4-nitro-m-toluidine in 100 ml. of toluene. The solution is stirred while a solution of 6.5 grams (0.055 mole) of sorboyl chloride in 25 ml. of toluene is slowly added. The reaction mixture is maintained at reflux temperature for about four hours until the evolution of hydrogen chloride ceases. Said mixture is then filtered and cooled, and the precipitate is collected. Recrystallization from toluene yields α,α,α-trifluoro-4'-nitro-m-sorbotoluidide, M.P. 123–124° C. Analysis shows 9.55% nitrogen as against a calculated value of 9.33% for $C_{13}H_{11}F_3N_2O_3$.

Example 14

A suitable reaction vessel is charged with a solution of 10.3 grams (0.05 mole) of α,α,α-trifluoro-4-nitro-m-toluidine in 100 ml. of toluene. The solution is stirred while a solution of 8.8 grams (0.055 mole) of 3-ethyl-2-hexenoyl chloride in 25 ml. of toluene is slowly added. The reaction mixture is maintained at reflux temperature for about four hours until the evolution of hydrogen chloride ceases. Said mixtlure is then filtered, and the solvent is removed by evaporation. Recrystallization of the residue from a mixture of toluene-methylcyclohexane yields 3-ethyl-α,α,α-trifluoro-4'-nitro-m-(2-hexeno)toluidide, M.P. 90–91° C. Analysis shows 8.30% nitrogen as against a calculated value of 8.48% for $C_{15}H_{17}F_3N_2O_3$.

Example 15

A suitable reaction vessel is charged with a solution of 10.3 grams (0.05 mole) of α,α,α-trifluoro-4-nitro-m-toluidine in 100 ml. of toluene. The solution is stirred while a solution of 8.7 grams (0.055 mole) of 2-nonenoyl chloride in 25 ml. of toluene is slowly added. The reaction mixture is maintained at reflux temperature for about four hours until the evolution of hydrogen chloride ceases. Said mixture is then filtered, and the solvent is removed by evaporation. Recrystallization of the residue from toluene yields α,α,α-trifluoro-4'-nitro-m-(2-noneno)toluidide, M.P. 59–60° C.

Example 16

A suitable reaction vessel is charged with a solution of 4.1 grams (0.02 mole) of α,α,α-trifluoro-4-nitro-m-toluidine in 100 ml. of toluene. The solution is stirred while a solution of 5.1 grams (0.055 mole) of 2-bromononanoyl chloride in 25 ml. of toluene is slowly added. The reaction mixture is maintained at reflux temperature for about three hours until the evolution of hydrogen chloride ceases. Said mixture is then filtered, and the solvent is removed by evaporation. Recrystallization of the residue from a mixture of toluene-methylcyclohexane yields 2-bromo-α,α,α-trifluoro-4'-nitro-m-nonanotoluidide, M.P. 102–103° C. Analysis shows 6.60% nitrogen as against a calculated value of 6.59% for $C_{16}H_{20}BrF_3N_2O_3$.

Example 17

A suitable reaction vessel is charged with a solution of 4.1 grams (0.02 mole) of α,α,α-trifluoro-4-nitro-m-toluidine in 100 ml. of toluene. The solution is stirred while a solution of 4.2 grams (0.02 mole) of 2-chloronananoyl chloride in 25 ml. of toluene is slowly added. The reaction mixture is maintained at reflux temperature for about three hours until the evolution of hydrogen chloride ceases. Said mixture is then filtered, and the solvent is removed by evaporation. Recrystallization of the residue from a mixture of toluene-methylcyclohexane yields 2-chloro-α,α,α-trifluoro-4'-nitro-m-nonanotoluidide, M.P. 55–56° C. Analysis shows 7.53% nitrogen as against a calculated value of 7.36% for $$C_{16}H_{20}ClF_3N_2O_3$$

Example 18

A suitable reaction vessel is charged with a solution of 13.7 grams (0.05 mole) of α,α,α,α',α',α'-hexafluoro-4-nitro-3,5-xylidine in 200 ml. of toluene. The solution is stirred while 8.8 grams (0.055 mole) of nonanoyl chloride are slowly added. The reaction mixture is maintained at reflux temperature for about three hours unitl the evolution of hydrogen chloride ceases. Said mixture is then cooled, and the precipitate is collected. Recrystallization from Skellysolve B yields α,α,α,α',α',α'-hexafluoro-4'-nitro-3',5'-nonanoxylidide.

Example 19

A suitable reaction vessel is charged with a solution of 10.3 grams (0.05 mole) of α,α,α-trifluoro-4-nitro-m-toluidine and 5.1 grams (0.05 mole) of triethylamine in 200 ml. of ether. The solution is stirred while a solution of 8.8 grams (0.05 mole) of nonanoyl chloride in 25 ml. of ether is slowly added. The reaction mixture is maintained at reflux temperature for about three hours, after which it is cooled, and the triethylamine hydrochloride is filtered off. The solvent is then removed by evaporation, and the residue is recrystallized twice from a toluene-methylcyclohexane mixture to yield an α,α,α-trifluoro-4'-nitro - m - nonanotoluide/α,α,α-trifluoro-4-nitro-m-toluidine complex, M.P. 84–85° C. Analysis shows 10.05% nitrogen as against a calculated value of 10.14% for $C_{23}H_{26}F_6N_4O_5$.

Example 20

About 10.0 grams of the product of the first recrystallization of Example 19 are dissolved in about 75 ml. of ether. An excess of ethereal hydrogen chloride is added to the solution, and the toluidine hydrochloride which forms precipitates upon standing. The precipitate is filtered off, and the solvent is removed from the filtrate by evaporation. The residue is recrystallized from a toluene-methylcyclohexane mixture to yield α,α,α-trifluoro-4'-nitro-m-nonanotoluidide, M.P. 69–70° C. Analysis shows 10.1% nitrogen as against a calculated value of 10.1% for $C_{16}H_{21}F_3N_2O_3$.

Example 21

A suitable reaction vessel is charged with a hot solution of 1.0 gram (0.003 mole) of the product of Example 4 and 0.68 gram (0.003 mole) of α,α,α-trifluoro-4-nitro-m-toluidine in 35 ml. of a toluene-methylcyclohexane mixture. The solution is permitted to cool, and a solid precipitates. The solvent is removed by evaporation, and the residue is recrystallized from a toluene-methylcyclohexane mixture to yield an α,α,α-trifluoro-4-methyl-4'-nitro-m-valerotoluidide/α,α,α-trifluoro-4-nitro-m-toluidine complex, M.P. 97–98° C.

Example 22

A suitable reaction vessel is charged with a solution of 6.9 grams (0.03 mole) of α,α,α-trifluoro-4-nitro-m-toluidine and 3.4 grams (0.03 mole) of triethylamine in 150 ml. of ether. The solution is stirred during the addition of 4.9 grams (0.03 mole) of heptanoyl chloride, and is thereafter maintained at reflux temperature for about six hours. It is then cooled, and the triethylamine hydrochloride is filtered off. The solvent is removed from the filtrate by evaporation, and the residue is recrystallized from toluene to yield an α,α,α-trifluoro-4'-nitro-m-heptanotoluidide/α,α,α-trifluoro-4-nitro-m-toluidine complex, M.P. 94–95° C. Analysis shows 10.4% nitrogen as against a calculated value of 10.7% for $C_{21}H_{22}F_6N_4O_5$.

Example 23

The product of Example 22 is dissolved in ether, and an excess of ethereal hydrogen chloride is added to the solution. The toluidine hydrochloride which forms precipitates upon standing and is filtered off. The solvent is removed from the filtrate by evaporation, and the residue is recrystallized from toluene to yield α,α,α-trifluoro-4-nitro-m-hepanotoluidide, M.P. 64–65° C. Analysis shows 8.69% as against a calculated value of 8.80% for $C_{14}H_{17}F_3N_2O_3$.

Example 24

A suitable reaction vessel is charged with a solution of 6.9 grams (0.03 mole) of α,α,α-trifluoro-4-nitro-m-toluidine and 3.4 grams (0.03 mole) of triethylamine in 150 ml. of ether. The solution is stirred during the addition of 5.4 grams (0.03 mole) of octanoyl chloride, and is thereafter maintained at reflux temperature for about 5 hours. It is then cooled, and the triethylamine hydrochloride is filtered off. The solvent is removed from the filtrate by evaporation, and the residue is recrystallized from toluene to yield an α,α,α-trifluoro-4'-nitro-m-octanotoluidide/α,α,α-trifluoro-4-nitro-m-toluidine complex, M.P. 90–91° C. Analysis shows 10.5% nitrogen as against a calculated value of 10.4% for $C_{22}H_{24}F_6N_4O_5$.

Example 25

The product of Example 24 is dissolved in ether and an excess of ethereal hydrogen chloride is added to the solution. The toluidine hydrochloride which forms precipitates upon standing and is filtered off. The solvent is removed from the filtrate by evaporation and the residue is recrystallized from toluene to yield α,α,α-trifluoro-4'-nitro-m-octanotoluidide, M.P. 72–73° C.

Example 26

A suitable reaction vessel is charged with a solution of 10.9 grams (0.05 mole) of lauroyl chloride in 75 ml. of ether. the solution is stirred while a solution of 10.3 grams (0.05 mole) of α,α,α-trifluoro-4-nitro-m-toluidine and 5.1 grams (0.05 mole) of triethylamine in 125 ml. of ether is slowly added. The reaction mixture is maintained at reflux temperature for about two hours, after which it is cooled, and the triethylamine hydrochloride is filtered off. The solvent is removed from the filtrate by evaporation and the residue is recrystallized from methylcyclohexane. The product obtained is then dissolved in ether and an excess of ethereal hydrogen chloride is added. The toluidine hydrochloride which forms precipitates upon standing and is removed by filtration. The filtrate is then evaporated and the residue is recrystallized from toluene to yield α,α,α-trifluoro-4'-nitro-m-laurotoluidide, M.P. 78–79° C. Analysis shows 7.11% nitrogen as against a calculated value of 7.21% for $C_{19}H_{27}F_3N_2O_3$.

Example 27

A suitable reaction vessel is charged with a hot solution of 0.5 gram (0.0017 mole) of the product of Example 1 and 0.35 gram (0.0017 mole) of α,α,α-trifluoro-4-nitro-m-toluidine in 10 ml. of a toluene-methylcyclohexane mixture. The solution is permitted to cool and a solid precipitate forms. The solvent is removed by filtration and the residue is recrystallized from a toluene-methylcyclohexane mixture to yield an α,α,α-trifluoro-4'-nitro-m-valerotoluidide/α,α,α - trifluoro-4-nitro-m-toluidine complex, M.P. 96–97° C.

Example 28

A suitable reaction vessel is charged with a hot solution of 0.5 gram (0.0016 mole) of the product of Example 5 and 0.34 gram (0.0016 mole) of α,α,α-trifluoro-4-nitro-m-toluidine in 10 ml. of a toluene-methylcyclohexane mixture. The solution is permitted to cool and a solid precipitate forms. The solvent is removed by filtration and the residue is recrystallized from a toluene-methylcyclohexane mixture to yield an α,α,α-trifluoro-4'-nitro-m-hexanotoluidide/α,α,α - trifluoro-4-nitro-m-toluidine complex, M.P. 106–107° C.

Example 29

A suitable reaction vessel is charged with a hot solution of 1.0 gram (0.034 mole) of the product of Example 2 and 0.71 gram (0.0034 mole) of α,α,α-trifluoro-4-nitro-m-toluidine in 10 ml. of a toluene-methylcyclohexane mixture. The solution is permitted to cool and a solid precipitate forms. The solvent is removed by filtration and the residue is recrystallized from a toluene-methylcyclohexane mixture to yield an α,α,α-trifluoro-4'-nitro-m-isovalerotoluidide/α,α,α - trifluoro-4-nitro-m-toluidine complex, M.P. 103–104° C.

Example 30

A suitable reaction vessel is charged with a solution of 10.1 grams (0.05 mole) of 10-undecenoyl chloride in 75 ml. of ether. The solution is stirred while a solution of 10.3 grams (0.05 mole) of α,α,α-trifluoro-4-nitro-m-toluidine and 5.1 grams (0.05 mole) of triethylamine in 125 ml. of ether is slowly added. The reaction mixture is maintained at reflux temperature for about two hours after which it is cooled and the triethylamine hydrochloride is filtered off. The solvent is then removed by evaporation and the residue is recrystallized from a toluene-methylcyclohexane mixture to yield α,α,α-trifluoro-4'-nitro-m-(10-undeceno)toluidide, M.P. 77–78° C. Analysis shows 7.18% nitrogen as against a calculated value of 7.52% for $C_{18}H_{23}F_3N_2O_3$.

Example 31

A suitable reaction vessel is charged with a solution of 10.3 grams (0.05 mole) of α,α,α-trifluoro-4-nitro-m-toluidine in 200 ml. of methylcyclohexane. The solution is stirred and heated to reflux temperature while 10.5 grams (0.055 mole) of neodecanoyl chloride is slowly added. The reaction mixture is maintained at reflux temperature for about two hours, and an emulsion which forms is separated by filtration. A heavy oil which is formed upon said filtration is then filtered through attapulgus clay to yield α,α,α-trifluoro-2,2-dimethyl-4'-nitro-m-octanotoluidide.

Example 32

A suitable reaction vessel is charged with a solution of 4.5 grams (0.022 mole) of α,α,α-trifluoro-4-nitro-m-toluidine in 100 ml. of toluene. The solution is stirred and heated to reflux temperature while a solution of 4.4 grams (0.0254 mole) of 2-nonynoyl chloride in 25 ml. of toluene is slowly added. The reaction mixture is maintained at reflux temperature for about four hours after which it is filtered while hot. The residual oil obtained is induced to crystallize from a toluene-methylcyclohexane mixture. The product is then recrystallized from a mixture of the same solvents to yield α,α,α-trifluoro-4'-nitro-m-(2-nonyno)toluidide, M.P. 47–48° C.

Example 33

A suitable reaction vessel is charged with 5.0 grams (0.014 mole) of α,α,α-trifluoro-4'-nitro-m-(2-noneno)toluidide in 100 ml. of carbon tetrachloride. The solution is stirred at a temperature of about 0–5° C. while a solution of 2.3 grams (0.014 mole) of bromine in 25 ml. of carbon tetrachloride is slowly added. The reaction mixture is maintained at about 0–5° C. for six hours after which 1.5 grams of potassium acetate in 10 ml. of ethanol is added. The resultant mixture is heated at reflux temperature for about one-half hour and thereafter cooled and filtered. The solvent is removed from the filtrate by evaporation, and the residue is recrystallized from a Skellysolve C (an essentially n-heptane solvent having a boiling range of 86–100° C.) -toluene mixture to yield 2,3-dibromo - α,α,α - trifluoro-4'-nitro-m-nonanotoluidide, M.P. 107–108° C. Analysis shows 5.62% nitrogen as against a calculated value of 5.57% for $C_{16}H_{19}Br_2F_3N_2O_3$.

Example 34

A suitable reaction vessel is charged with a solution of 1.5 grams (0.003 mole) of the product of Example 33 and 0.6 grams (0.006 mole) of potassium acetate in 50 ml. of ethanol. The solution is maintained at reflux temperature for about two hours. It is then filtered and the solvent is removed from the filtrate by evaporation. The residue is taken up in ether and washed with water. The ether solution is then dried over sodium sulfate, and the solvent is removed to yield 2-bromo-α,α,α-trifluoro-4'-nitro-m-(2-noneno)toluidide.

As pointed out above, the compositions of matter of this invention have been found to possess useful and unexpected microbiological activity. In this regard, such compositions have been found to be particularly effective in the control of bacteria. To demonstrate the aforesaid control, the following test procedure was employed. Stock solutions were prepared by dissolving 100 mg. of the compound to be tested in 10 ml. of acetone, alcohol, or other solvents. These stock solutions were serially diluted by pipetting 2 ml. of the stock solution into 18 ml. of sterile nutrient agar to obtain a $1 \times 10^3$ dilution and continuing this procedure in the same manner to obtain further dilutions up to $1 \times 10^6$. The agar was poured into Petri dishes, allowed to harden, and was then spot inoculated with one drop of a cell suspension of *Staphylococcus aureus*. The suspension was prepared by suspending the growth from a 24 hour nutrient agar slant culture in 10 ml. of distilled water. The inoculated samples were incubated at 37° C. for 48 hours and were thereafter examined to determine whether or not bacterial growth had occurred.

When the above test was conducted with various compositions of this invention, it was found that representative compounds such as those of Examples 7, 13, 14, 20 and 22 showed no growth of bacteria at a dilution of at least one part per one million parts of diluent. Similar results were obtained with other compositions of matter of this invention.

In order to demonstrate that the aforesaid microbiological activity of this invention is unexpected, tests were also run with closely related compounds including various homologs and chain and position isomers. The closely related compounds tested include:

α,α,α-trifluoro-4'-nitro-m-acetotoluidide
α,α,α-trifluoro-4'-nitro-m-propionotoluidide
α,α,α-trifluoro-4'-nitro-m-butyrotoluidide
α,α,α-trifluoro-4'-nitro-m-isobutyrotoluidide
α,α,α-trifluoro-4'-nitro-m-trimethylacetotoluidide
α,α,α-trifluoro-N-methyl-4'-nitro-m-nonanotoluidide α,α,α-trifluoro-4'-nitro-m-tridecanotoluidide
α,α,α-trifluoro-2,2-dimethyl-4'-nitro-m-undecanotoluidide
α,α,α-trifluoro-4'-nitro-m-myristotoluidide
α,α,α-trifluoro-4'-nitro-m-palmitotoluidide
α,α,α-trifluoro-4'-nitro-m-oleotoluidide
α,α,α-trifluoro-4'-nitro-cyclobutanecarboxy-m-toluidide
α,α,α-trifluoro-4'-nitro-m-phenylacetotoluidide
α,α,α-trifluoro-4'-nitro-2-(2,4-dichlorophenoxy)-m-acetotoluidide
α,α,α-trifluoro-4'-nitro-2-(2,4,5-trichlorophenoxy)-m-acetotoluidide
α,α,α-trifluoro-4'-nitro-o-nonanotoluidide
α,α,α-trifluoro-2'-nitro-p-nonanotoluidide All of the above compounds were found to be either completely inactive or to control the growth of the bacteria only at concentrations at least ten times greater than the effective concentrations of the most closely related counterparts of this invention.

It should be recognized that while all of the compositions of matter of this invention as defined above are useful for the purposes described, a particularly preferred group of compounds are those of the formula

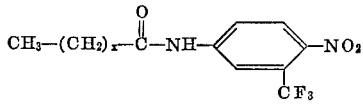

wherein $x$ is an integer from 4 to 10 inclusive. This preferred group of compounds has been found to display particularly outstanding effectiveness in the above described tests.

While the invention has been described herein with regard to certain specific embodiments, it is not so limited. It is to be understood that variations and modifications thereof may be made by those skilled in the art without departing from the spirit and scope of the invention.

What is claimed is:

1. A composition of matter selected from the group consisting of a compound of the formula

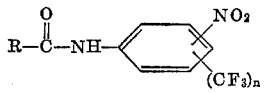

wherein: R is selected from the group consisting of alkyl, alkenyl, alkyldienyl and alkynyl of from 4 to 11 carbon atoms; dihaloalkyl and mono- and dihaloalkenyl of from 4 to 11 carbon atoms, the halogen being selected from the group consisting of chlorine and bromine; cycloalkyl of from 5 to 6 carbon atoms and phenethyl;

provided however that when the carbon atom of R which is directly attached to the carbonyl group of the anilide is a tertiary carbon atom, then R must contain a total of at least 6 carbon atoms;

$n$ is an integer selected from 1 and 2; and the aniline nucleus is free of ortho substituents;

and a 1:1 molar complex thereof with α,α,α-trifluoro-4-nitro-m-toluidine.

2. A compound of the formula

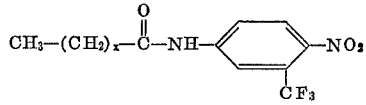

wherein: $x$ is an integer from 4 to 10 inclusive.

3. α,α,α-trifluoro-4'-nitro-m-nonanotoluidide.
4. α,α,α-trifluoro-4'-nitro-m-heptanotoluidide.
5. α,α,α-trifluoro-4'-nitro-m-octanotoluidide.

6. A process which comprises preparing a hot solution of substantially equimolar amounts of α,α,α-trifluoro-4-nitro-m-toluidine and a compound of the formula

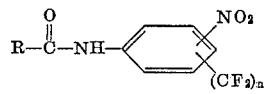

wherein: R is selected from the group consisting of alkyl, alkenyl, alkyldienyl and alkynyl of from 4 to 11 carbon atoms; mono- and dihaloalkyl and alkenyl of from 4 to 11 carbons, the halogen being selected from the group consisting of chlorine and bromine; cycloalkyl of from 5 to 6 carbon atoms and phenethyl;

provided however that when the carbon atom of R which is directly attached to the carbonyl group of the anilide is a tertiary carbon atom, then R must contain a total of at least 6 carbon atoms;

$n$ is an integer selected from 1 and 2; and the aniline nucleus is free of ortho substituents; in an inert, organic solvent, and cooling said solution to precipitate a 1:1 molar complex of said toluidine and said compound.

References Cited

UNITED STATES PATENTS

| 3,332,768 | 7/1967 | Freund et al. | 260—562 |
| 3,192,215 | 6/1965 | Krapcho | 260—562 |

HENRY R. JILES, *Primary Examiner.*

H. I. MOATZ, *Assistant Examiner.*

U.S. Cl. X.R.

260—557, 558, 562, 999